United States Patent
Güntzer et al.

(10) Patent No.: US 6,226,497 B1
(45) Date of Patent: May 1, 2001

(54) MOTOR VEHICLE BUILT-IN UNIT FOR MOBILE PHONE

(75) Inventors: Peter Güntzer, Gröbenzell; Herbert Stenger, Puchheim, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/468,373

(22) Filed: Dec. 20, 1999

Related U.S. Application Data

(63) Continuation of application No. PCT/DE98/01060, filed on Apr. 15, 1998.

(30) Foreign Application Priority Data

Jun. 20, 1997 (DE) .............................. 197 26 320

(51) Int. Cl.[7] .................................................. H04B 1/38
(52) U.S. Cl. ........................... 455/66; 455/557; 455/90; 455/346
(58) Field of Search .......................... 455/66, 557, 569, 455/90, 345, 346, 349, 127, 572; 439/34, 502, 623, 297; 379/455; 370/901, 937, 995, 425.5, 426

(56) References Cited

U.S. PATENT DOCUMENTS

| | | | |
|---|---|---|---|
| 3,569,788 | * 3/1971 | Niblack | 455/345 |
| 4,638,293 | * 1/1987 | Min | 340/426 |
| 4,881,910 | * 11/1989 | Odemer | 439/297 |
| 5,333,177 | * 7/1994 | Braitberg et al. | 455/557 |
| 5,479,479 | * 12/1995 | Braitberg et al. | 455/557 |
| 5,659,594 | * 8/1997 | Toda | 455/552 |
| 5,774,793 | * 6/1998 | Cooper et al. | 455/345 |
| 5,971,799 | * 10/1999 | Swade | 439/623 |

* cited by examiner

Primary Examiner—Nguyen T. Vo
Assistant Examiner—Lester G. Kincaid
(74) Attorney, Agent, or Firm—Herbert L. Lerner; Laurence A. Greenberg; Werner H. Stemer

(57) ABSTRACT

A motor vehicle built-in unit for a mobile phone has a central control unit and an interface for exchanging signals between the central control unit of the mobile phone and the motor vehicle. The built-in unit also has a motor vehicle-specific adapter control unit for adapting functions of the interface and/or of the central control unit to the respective type of motor vehicle. The modular design allows for electrical and mechanical adaptation to various types of motor vehicles so that the central control unit and interface can be identical for a wide variety of motor vehicles. An alternative built-in unit has a central unit and an interface for connecting to the motor vehicle. The interface is designed to connect the built-in unit to the motor vehicle selectively either with a standardized plug-type connector or a motor vehicle-specific plug-type connector. The motor vehicle built-in unit can therefore easily be adapted to the type of plug which is used in the respective motor vehicle.

20 Claims, 8 Drawing Sheets

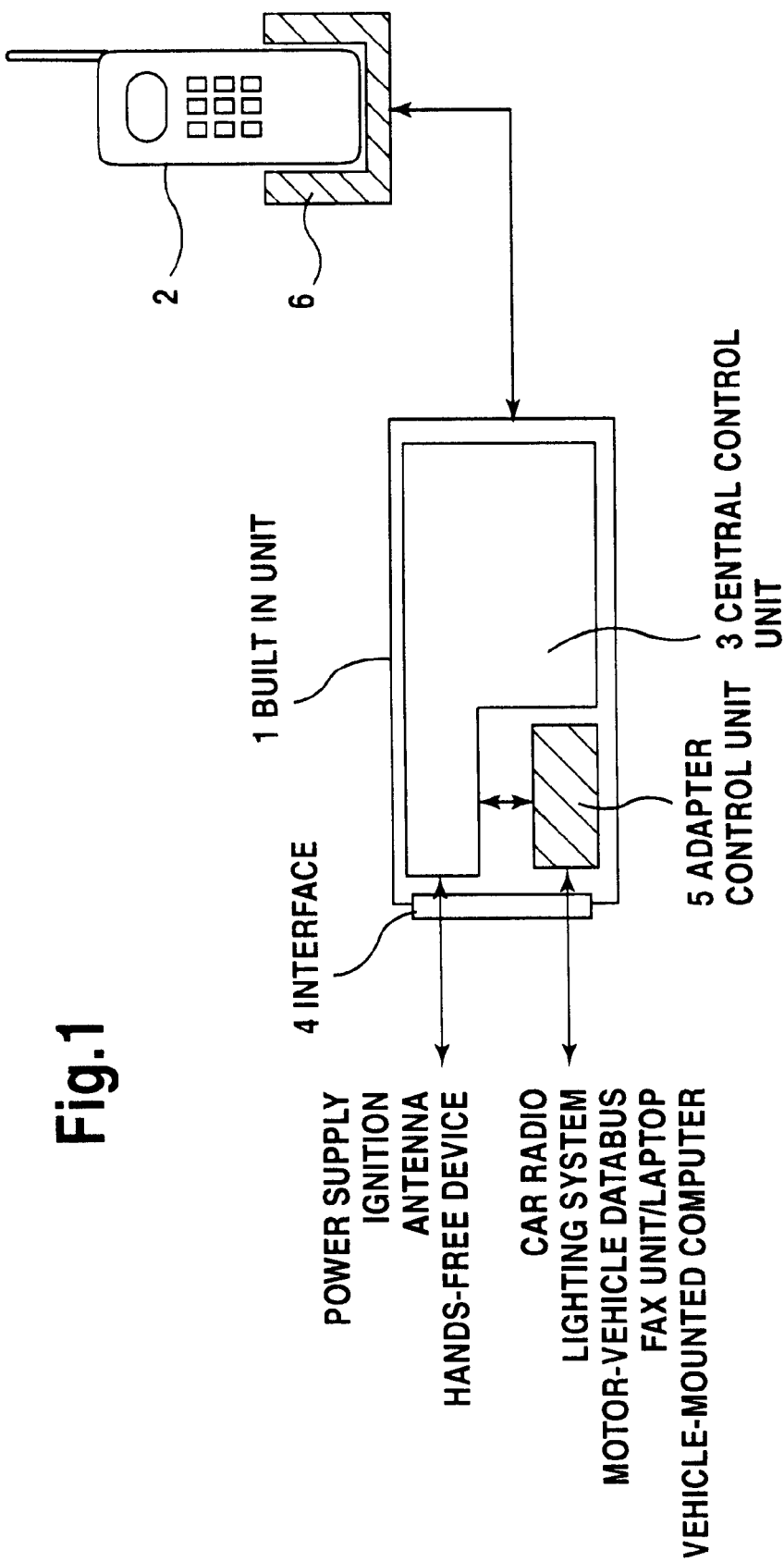

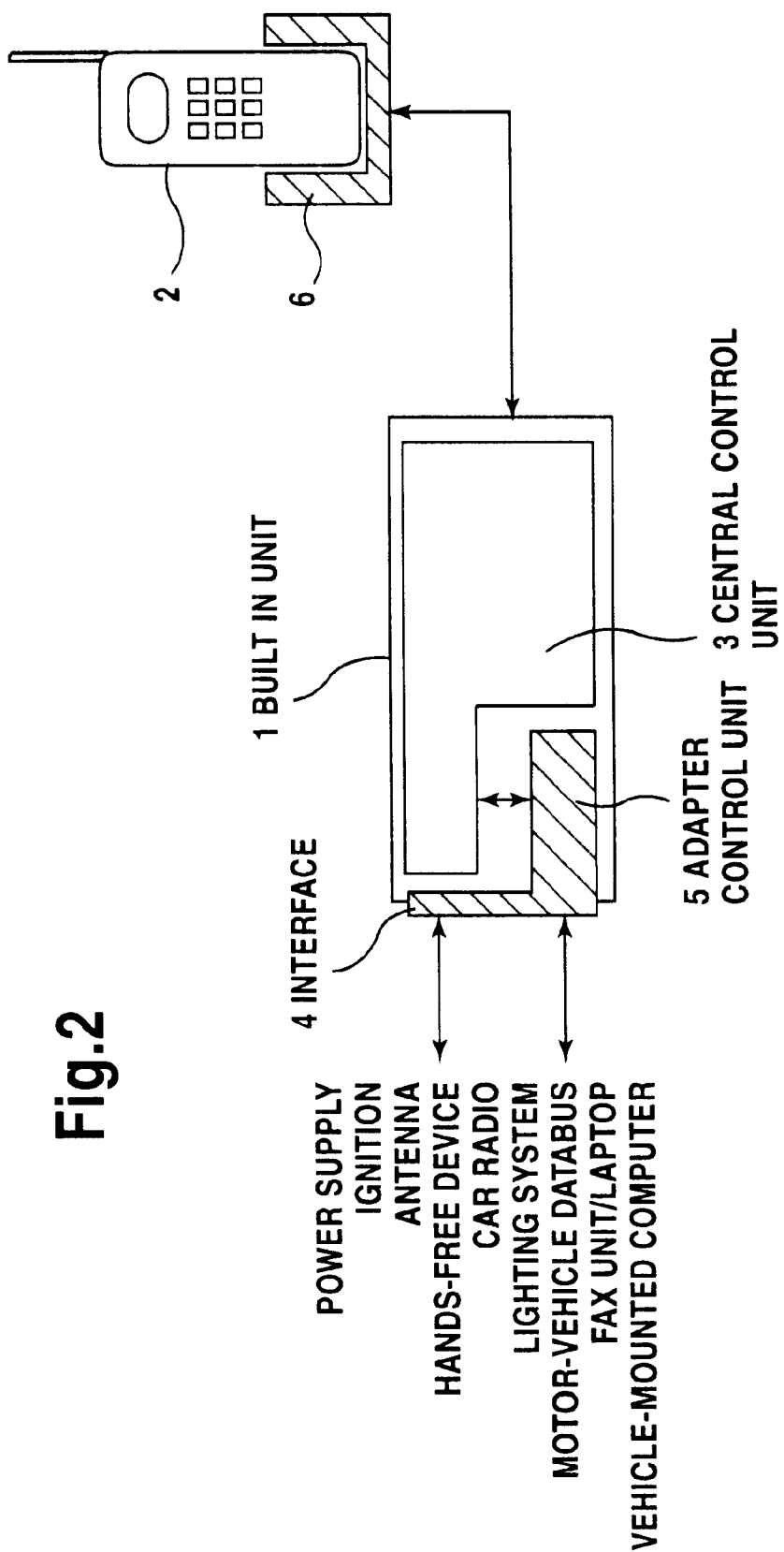

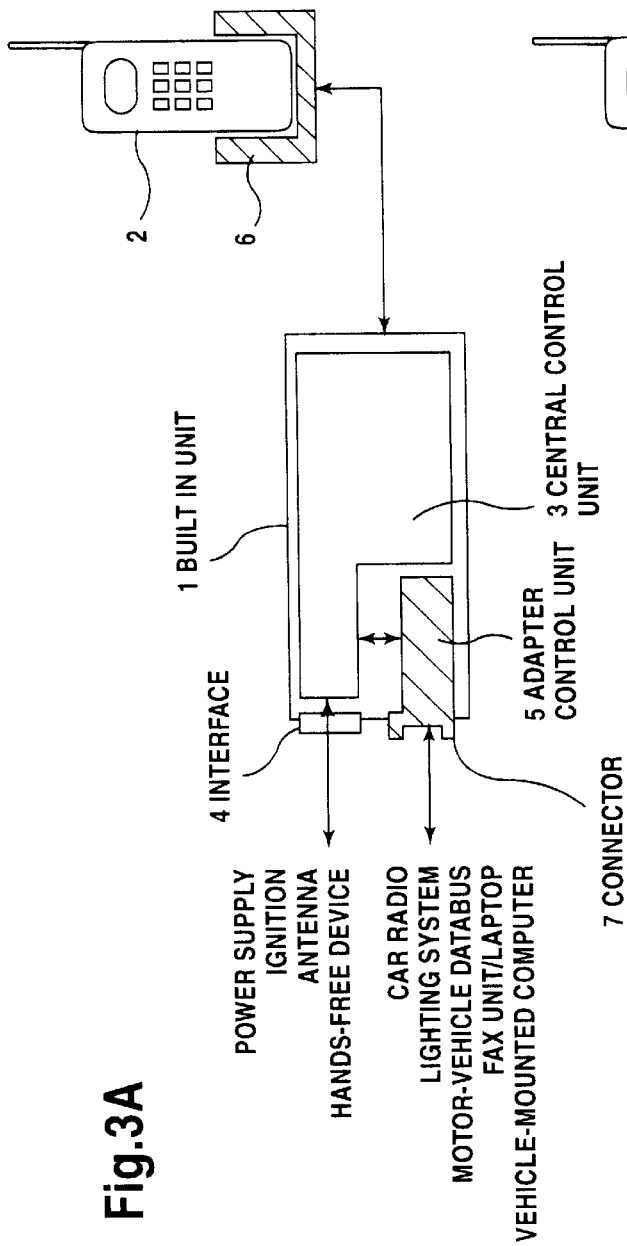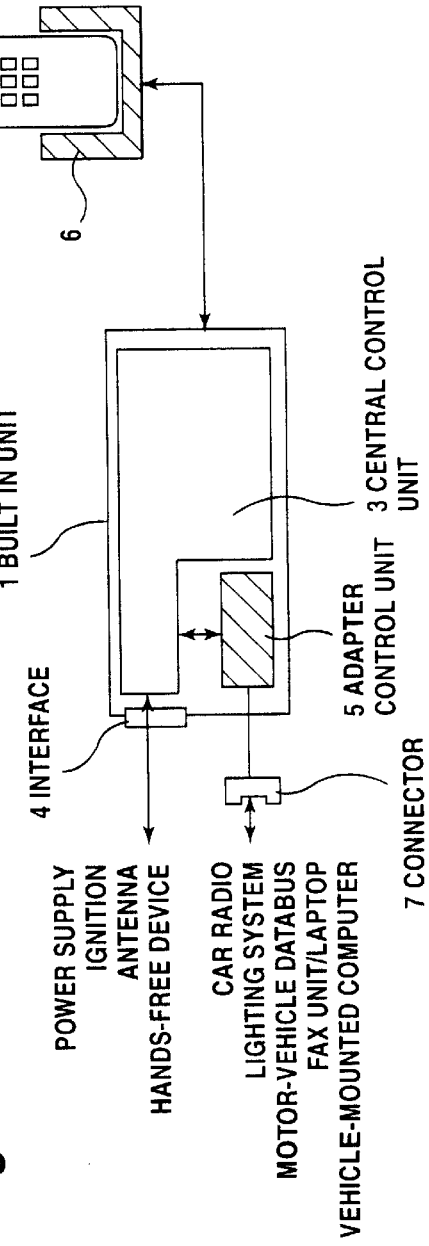

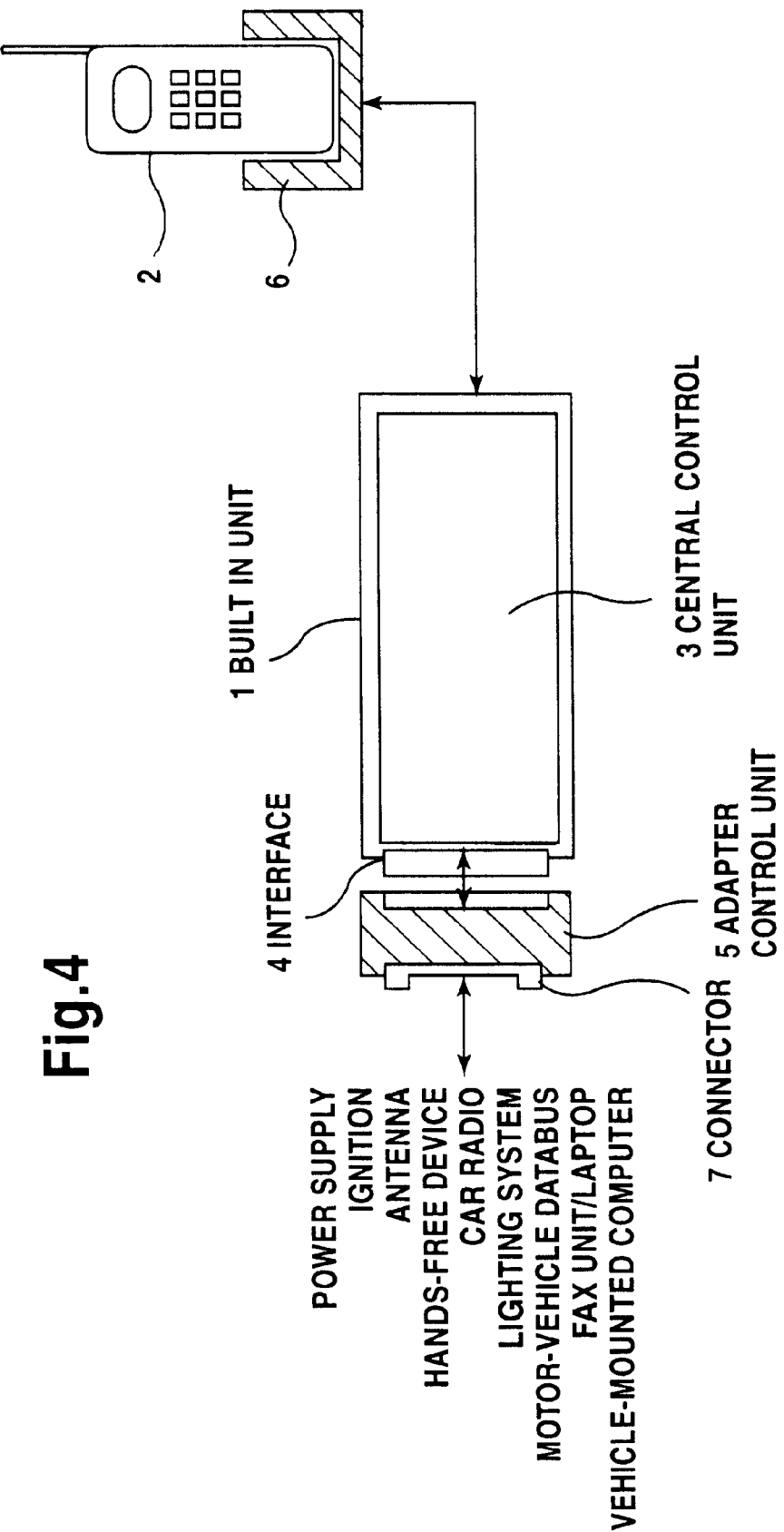

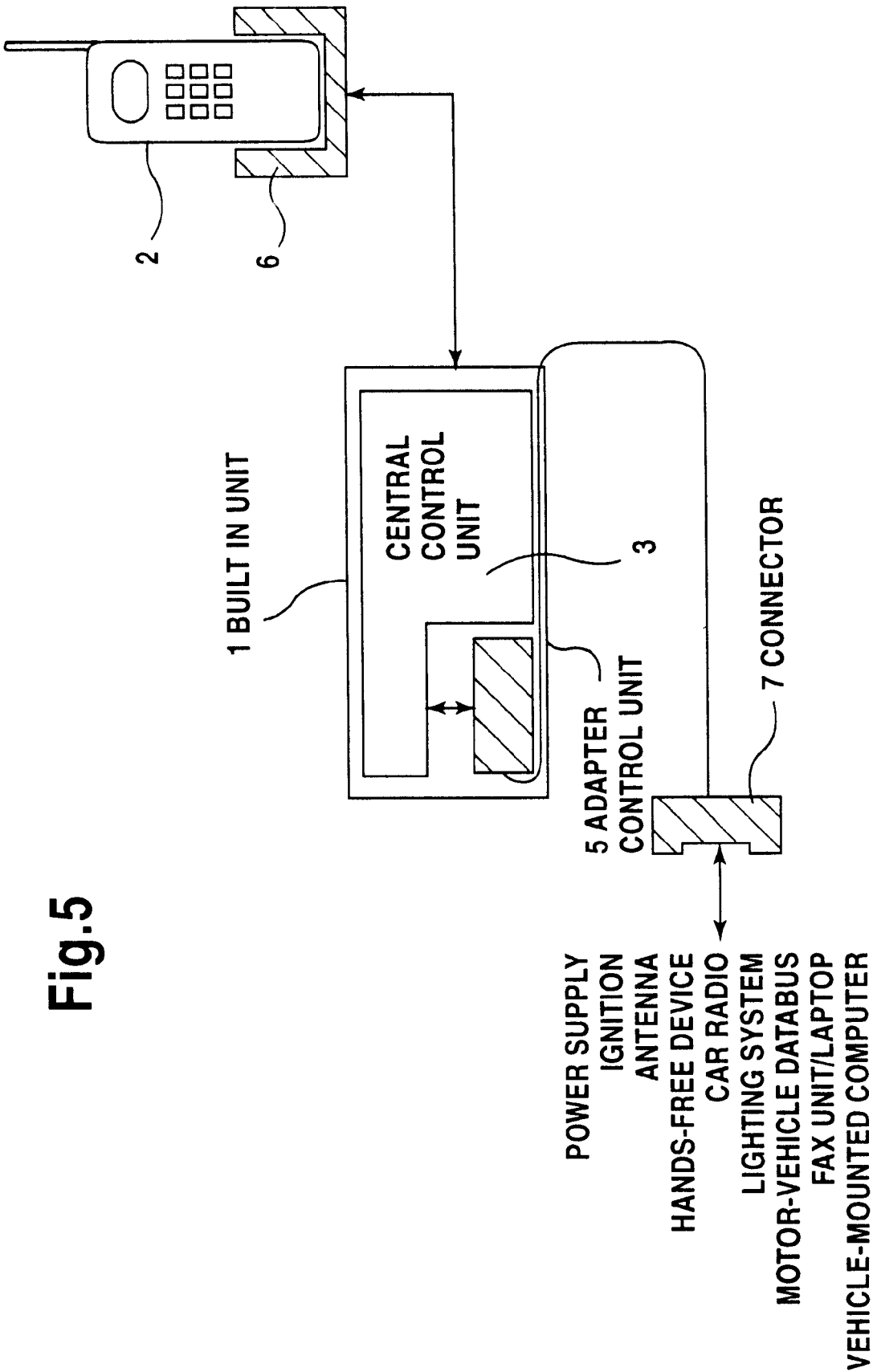

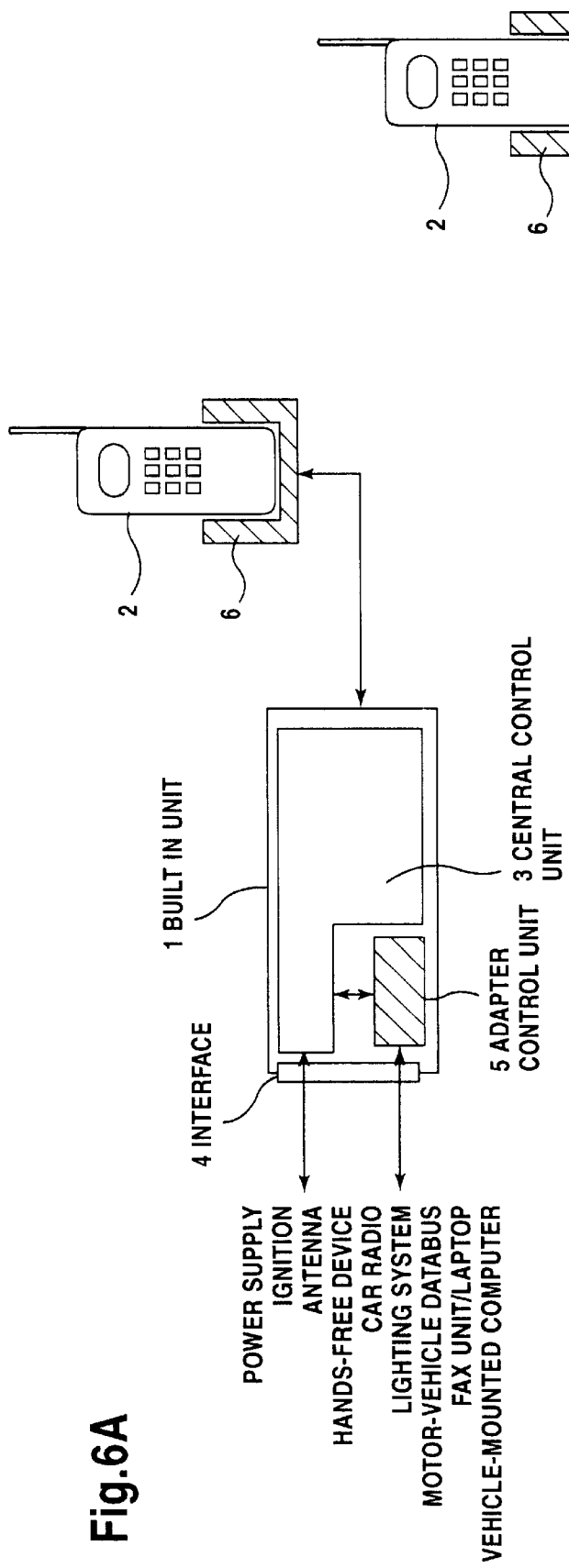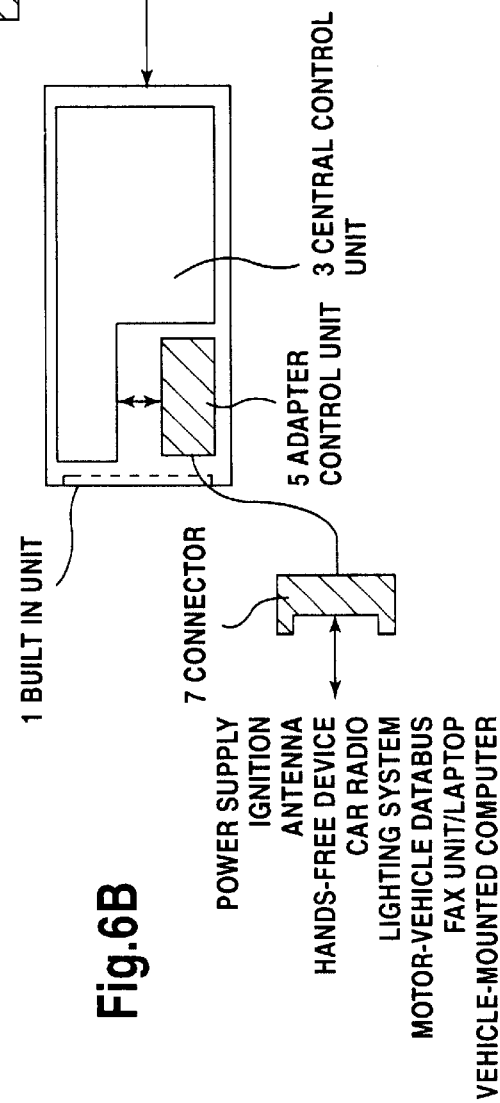
Fig.6A
Fig.6B

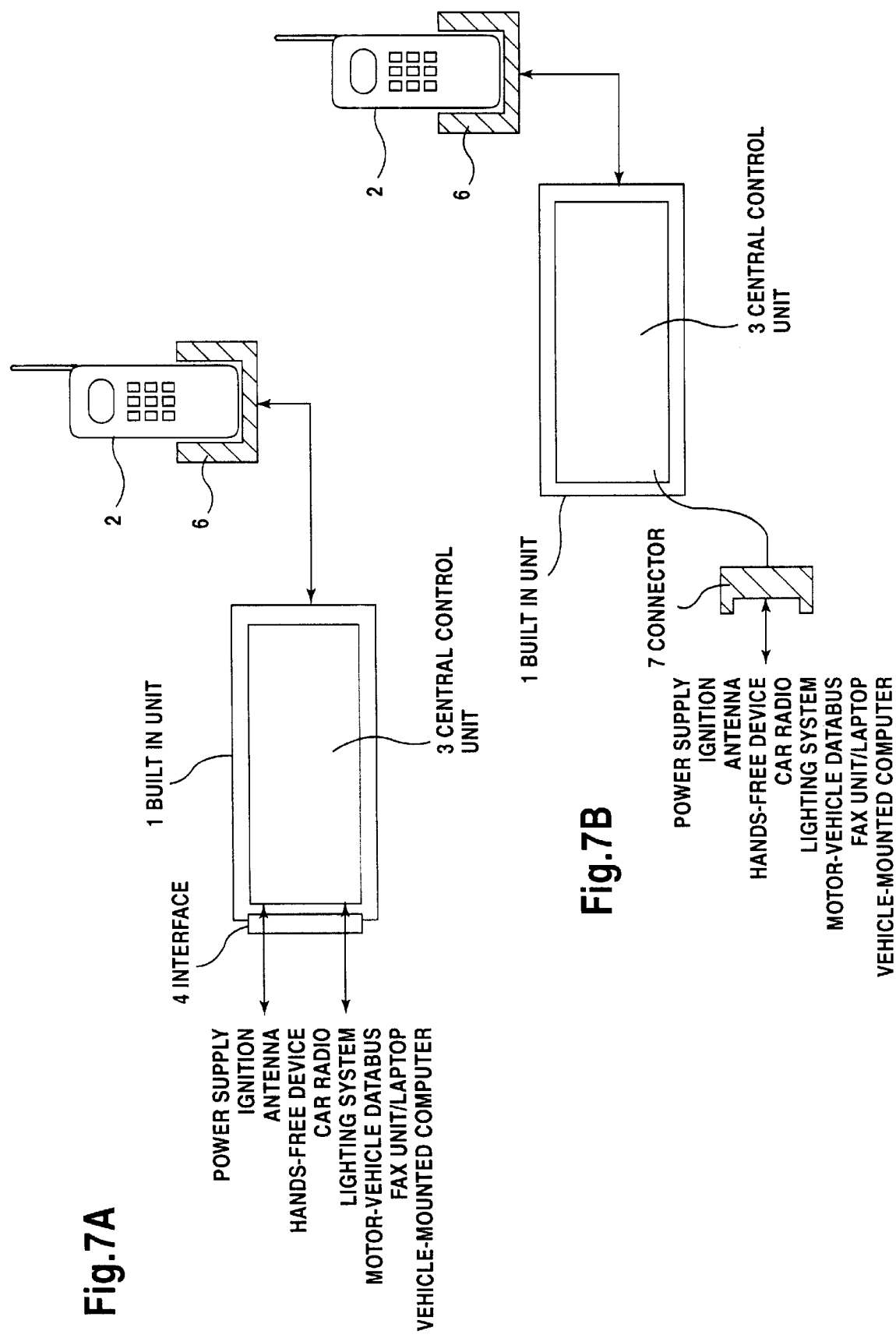

MOTOR VEHICLE BUILT-IN UNIT FOR MOBILE PHONE

CROSS-REFERENCE TO RELATED APPLICATION

This is a continuation of copending International Application PCT/DE98/01060, filed Apr. 15, 1998, which designated the United States.

BACKGROUND OF THE INVENTION

1. Field of the Invention

The invention relates to a motor vehicle built-in unit for mobile phones.

In general terms, such a motor vehicle built-in unit for mobile phones has a central control unit for controlling the functions of the built-in unit, a connection to the mobile phone to supply an operating voltage, to exchange voice and/or data signals or the like, and an interface to transmit signals from and to the motor vehicle. The power supply, radio-frequency signals for connecting the mobile phone to a motor vehicle antenna, an ignition signal, and voice signals for connecting to a hands-free system (loudspeaker and microphone) are exchanged between the motor vehicle and built-in unit for the mobile phone. Furthermore, it is possible to provide for data signals to be exchanged with a driver information system, the car radio or a motor vehicle data bus or an external fax unit or portable computer. A further possibility is also to illuminate the display panel of the mobile phone using the dashboard illumination system of the motor vehicle.

Currently only a few of the above-mentioned electrical signals are standardized among different motor vehicle manufacturers and types of motor vehicles such as, for example, the 12 volt vehicle electrical system or the ignition signal. However, this also again applies only to passenger cars. The other types of signal differ depending on the motor vehicle manufacturer or type of motor vehicle. Thus, there is the problem that the central control unit of the motor vehicle built-in unit has to have a specific design for each type of motor vehicle. This requires a high level of expenditure on development and manufacture and therefore makes the motor vehicle built-in unit expensive.

A further problem is the mechanical connection of the motor vehicle built-in unit to the electrical circuits of the motor vehicle.

Moves are under way to standardized these systems. For instance, the motor vehicle manufacturers that make up the Association of German Motor Vehicle Manufacturers (Verband Deutscher Automobilhersteller—VDA) have agreed on a guideline which is intended to define the mechanical and electrical interface between a motor vehicle built-in unit and the motor vehicle. However, in particular supplementary functions such as communication between the motor vehicle's own communication system and the wireless telephone, are only insufficiently defined in the VDA guideline.

A plug-type connector which is defined in the VDA guideline is not used universally in motor vehicles either. In particular, motor vehicle manufacturers which do not belong to the VDA are not bound to the guideline. For this reason, there is the problem that a motor vehicle built-in unit has to be equipped with different plug-type connectors in order to be used with different types of motor vehicle. This also increases the price of the built-in unit.

European published patent application EP 0 723 378 describes a built-in unit for a mobile phone in a motor vehicle. Specifically, there is disclosed a possible way of connecting a multiplicity of different mobile phones (for example units from different manufacturers) to an interface. On the other hand, at the motor vehicle end there is provided a standardized, universal (bus) plug-type connector.

2. Summary of the Invention

It is accordingly an object of the invention to provide a motor vehicle built-in unit for a mobile phone, which overcomes the above-mentioned disadvantages of the heretofore-known devices of this general type and which can be retrofitted with the smallest possible degree of expenditure and costs for use with different types of motor vehicles.

With the foregoing and other objects in view there is provided, in accordance with the invention, a motor vehicle built-in unit for a mobile phone, comprising:

a central control unit to be connected to a mobile phone;

an interface connected between and adapted to exchange signals between the central control unit and a motor vehicle; and a motor vehicle-specific adapter control unit for adapting functions of one of the interface and the central control unit to the respective type of motor vehicle.

In other words, the novel built-in unit has a motor vehicle-specific adapter unit for adapting functions of the interface and/or central control unit to the respective type of motor vehicle. The central control unit and the interface are independent of the type of motor vehicle and can therefore be used universally and produced in large numbers. The adaptation to the respective type of motor vehicle is effected by means of the motor vehicle-specific adapter control unit. A further advantage of the motor vehicle built-in unit according to the invention is that subsequent adaptation to new types of motor vehicles or implementation of new functions is made easier.

In accordance with an added feature of the invention, the adapter control unit includes a device for converting respective signal levels present at the interface. The adapter control unit can thus have a device for converting different signal levels present at the interface, from the motor vehicle on the one hand and from the built-in unit on the other, and a device for converting signals from a motor vehicle-specific communications protocol into a telephone-specific communications protocol, and vice versa. The adapter control unit can also make it possible to connect the mobile phone to the radio of the motor vehicle, the lighting system of the motor vehicle and/or a databus of the motor vehicle. As a result, supplementary functions are made possible, for example enabling the audio output stage or the loudspeakers of the motor vehicle radio or the lighting control system to be used for the mobile phone.

In accordance with an additional feature of the invention, a housing is provided which commonly houses the adapter control unit, the central control unit, and the interface. This has the advantage that it is not necessary to change the design of the housing when adapting the motor vehicle built-in unit to a new type of motor vehicle or when new functions are adopted. The adapter control unit can be implemented as a plug-in board which can be plugged onto a motherboard, which makes it easier to exchange the adapter control unit.

In accordance with an alternative feature of the invention, a separate housing encloses the adapter control unit. In that case, a standardized plug-type connector connects the adapter control unit to the central control unit, and a motor vehicle-specific plug-type connector connects the adapter control unit to the motor vehicle.

In an alternative embodiment, the adapter control unit may be embodied in a separate housing, which can be connected to the built-in unit by means of a standardized plug-type connector or an internal plug-type connector, and to the motor vehicle by means of a motor vehicle-specific plug-type connector. This permits simultaneous electrical and mechanical adaptation to the respective type of motor vehicle.

The connection between the built-in unit and motor vehicle can be made by means of a standardized plug-type connector, for example according to the VDA guideline, or by means of a motor vehicle-specific plug-type connector. Both types of plug-type connector may also be provided simultaneously, the central control unit preferably being connected to the motor vehicle by means of a standardized plug-type connector, and the adapter control unit preferably being connected to the motor vehicle by means of a motor vehicle-specific plug-type connector. Standard functions such as power supply and a hands-free device can then be provided using the standardized plug-type connector, and supplementary functions such as the lighting system, connection to the car radio or motor vehicle databus can be provided using the motor vehicle-specific plug-type connector. This has the advantage that the motor vehicle-specific plug-type connector can have a smaller number of poles, and thus be manufactured more economically.

Alternatively, the interface of the motor vehicle built-in unit according to the invention may be designed in such a way that the connection to the motor vehicle can be made either by means of a standardized plug-type connector or a motor vehicle-specific plug-type connector. Adaptation to different mechanical types of plug can then easily be effected without greatly changing the built-in unit itself.

The invention also proposes a motor vehicle built-in unit for mobile phones in which the interface is designed to connect the built-in device to the motor vehicle either by means of a standardized plug-type connector or a motor vehicle-specific plug-type connector.

The motor vehicle-specific plug-type connection here can be led through the housing of the motor vehicle built-in unit by means of a cable harness. Such a design permits a maximum degree of flexibility in the adaptation of the built-in unit to different plug systems of different motor vehicles, because the motor vehicle-specific plug-type connector is arranged at the end of the cable harness and no longer on or in the housing of the built-in unit.

With the above and other objects in view there is also provided, in accordance with the invention, a motor vehicle built-in unit for a mobile phone, which comprises:
  a central control unit; and
  an interface for exchanging signals between the central control unit and a motor vehicle, the interface being adapted to connect the central control unit to the motor vehicle selectively via a standardized plug-type connector or a motor vehicle-specific plug-type connector.

In accordance with again another feature of the invention, a housing encloses the central control unit, and the motor vehicle-specific plug-type connector is connected to the central control unit via a cable connection guided through the housing.

In accordance with a concomitant feature of the invention, the cable connection is guided through a housing cutout of the standardized plug-type connector.

Other features which are considered as characteristic for the invention are set forth in the appended claims.

Although the invention is illustrated and described herein as embodied in a motor vehicle built-in unit for mobile phone, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic view of a first exemplary embodiment of a motor vehicle built-in unit according to the invention;

FIG. 2 shows a second exemplary embodiment of a motor vehicle built-in unit according to the invention;

FIG. 3 shows a third exemplary embodiment of a motor vehicle built-in unit according to the invention;

FIG. 4 shows a fourth exemplary embodiment of a motor vehicle built-in unit according to the invention;

FIG. 5 shows a fifth exemplary embodiment of a motor vehicle built-in unit according to the invention;

FIG. 6 shows a sixth exemplary embodiment of a motor vehicle built-in unit according to the invention;

FIG. 7 shows a seventh exemplary embodiment of a motor vehicle built-in unit according to the invention.

DESCRIPTION OF THE PREFERRED EMBODIMENTS

Figure 8:
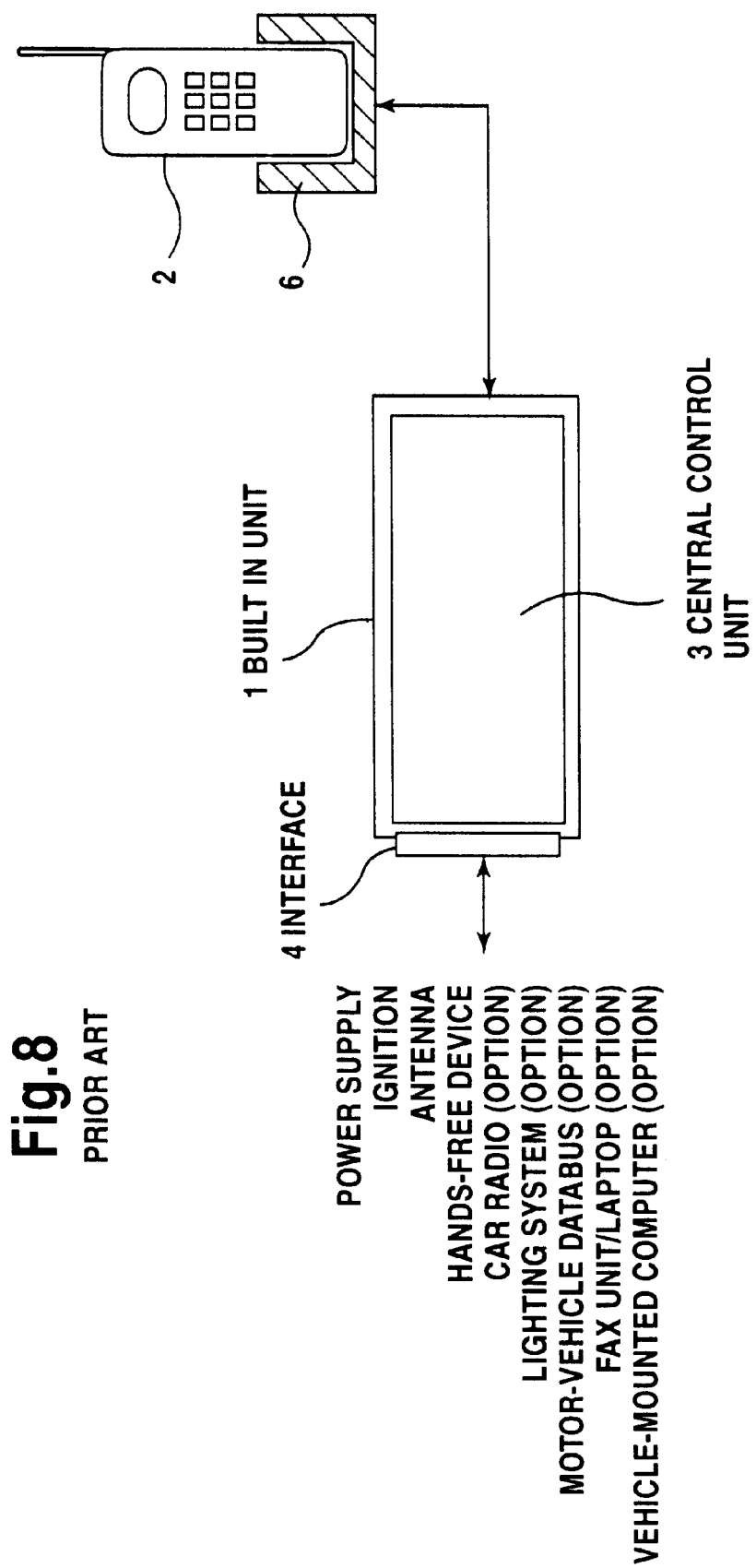
FIG. 8 is a diagrammatic view of a motor vehicle built-in unit according to the prior art.

Referring now to the figures of the drawing in detail and first, particularly, to FIG. 1 thereof, there is seen a first exemplary embodiment of a motor vehicle built-in unit according to the invention. The motor vehicle built-in unit is designated in its entirety with the reference numeral 1. The built-in unit is connected, similarly to the prior art motor vehicle built-in unit (see FIG. 8), to a mount 6 for a mobile phone 2. The invention is not restricted here to mobile phones, but rather can also be applied to mobile phone modules, that is to say functional assemblies without their separate key pad or display as so-called "embedded systems". The built-in unit 1 has a central control unit 3 for controlling the functions of the motor vehicle built-in unit such as charging the mobile phone accumulator, actuating a hands-free device or passing on radio-frequency signals to a motor vehicle antenna. A standardized plug-type connector 4, for example complying with the VDA guideline mentioned at the beginning, serves as the mechanical interface with the motor vehicle.

The central control unit 3 controls those functions of the built-in unit and those interface connections which are standardized in the majority of motor vehicles that are suitable for a built-in mobile phone, for example the 12 volt power supply or the ignition signal which can be used to switch on the mobile phone. The method of actuating the antenna and the hands-free device are also largely standardized.

Other functions, such as the motor-vehicle lighting system, are designed differently in different passenger cars. The transmission of data to external devices such as an external telefax unit or a portable computer are not covered by the above-mentioned VDA standard either. Furthermore, motor vehicles exist with a motor vehicle-specific communications protocol, for example a so-called "vehicle area network" (VAN) which can be used in a vehicle-mounted computer. The motor vehicle built-in unit according to the invention contains the motor vehicle-specific adapter control unit 5 in order to implement further functions of the motor vehicle built-in unit, for the example activation of the display illumination of the mobile phone when the dashboard lighting system of the motor vehicle is switched on, or the use of the audio output stage or of the loudspeakers of the motor vehicle audio system for the mobile phone. The adapter control unit 5 is used to adapt the central control unit 3 and the interface 4 of the motor vehicle built-in unit to the respective motor vehicle. It is thus possible to implement, as a further function, the transmission of data between a motor vehicle databus or vehicle-mounted computer and the mobile phone or the built-in unit. The housing and the central control unit 3 of the built-in device can therefore be used for a wide variety of types of motor vehicle. Only the adapter control unit 5, which may be embodied for example as a plug-in circuit board, has to be specifically developed for a motor vehicle manufacturer or type of motor vehicle. This modular design reduces the development costs and manufacturing costs for the motor vehicle built-in unit. In addition, the system can easily be adapted to new types of motor vehicle or new functions can easily be implemented by exchanging the adapter control unit.

A second exemplary embodiment of a motor vehicle built-in unit according to the invention is illustrated in FIG. 2. This differs from the first exemplary embodiment shown in FIG. 1 in that the adapter control unit 5 is embodied together with the plug-type connector 4. The adapter module thus controls the control unit 5 and plug-type connector 4 and is exchanged as one unit. Thus, both electronic and mechanical adaptation to the motor vehicle are possible without changing the central control unit.

FIGS. 3A and 3B show a further exemplary embodiment of the motor vehicle built-in unit according to the invention. In this alternative embodiment, two plug-type connectors, a standardized plug-type connector 4 and a motor vehicle-specific plug-type connector 5 are provided. Similarly to the second exemplary embodiment shown in FIG. 2, the adapter control unit 5 is embodied together with the motor vehicle-specific plug-type connector 7. The adapter control unit and the motor vehicle-specific plug-type connector can therefore be installed in a way which corresponds to the respective motor vehicle, while the central control unit 3 and the standardized plug-type connector 4 can be used universally. In FIG. 3B, the motor vehicle-specific plug-type connector is connected to the outside by means of a cable.

Referring now to FIG. 4, there is shown a fourth exemplary embodiment of a motor vehicle built-in unit according to the invention. The adapter control unit 5 is accommodated in a separate housing. The separate housing is attached to the main housing of the motor vehicle built-in unit 1 via a standardized plug-type connector 4. The connection to the motor vehicle is made via a motor vehicle-specific plug-type connector 7. In motor vehicles which do not use standardized plug-type connectors, it is possible in this way to carry out the electrical and mechanical adaptation of the motor vehicle built-in unit to the motor vehicle by plugging on the adapter module.

FIG. 5 shows a further exemplary embodiment, which is a variant of the fourth exemplary embodiment. Again, only one motor vehicle-specific plug-type connector 7 is used for connection to the motor vehicle. However, the adapter control unit 5 is located in the main housing of the motor vehicle built-in unit 1, and a cable harness is led from the adapter control unit 5 through the housing to the plug-type connector 7. As a result, the plug-type connector 7 can be replaced with another plug-type connector with little effort.

A sixth exemplary embodiment of a motor vehicle built-in unit according to the invention is illustrated in FIGS. 6A and 6B. The standardized plug-type connector 4 is of removable design. FIG. 6A shows the first state of this exemplary embodiment in which the connection is made to the motor vehicle by means of the standardized plug-type connector 4. However, if the motor vehicle requires a specific plug-type connector, the standardized plug-type connector 4 can easily be removed and replaced with a panel, and a cable connection from the adapter control unit 5 is led to the motor vehicle-specific plug-type connector 7 through the housing of the built-in unit, preferably through the housing cutout provided for the plug-type connector 4. The adapter control unit 5 is embodied in such a way that the exchange of signals with the motor vehicle can be carried out either by means of the standardized plug-type connector 4 or by means of the motor vehicle-specific plug-type connector. This exemplary embodiment has the advantage of a very high degree of flexibility, because the electrical and mechanical adaptation (by means of the plug-type connector) to the motor vehicle can be implemented in a completely unrestricted way.

FIG. 7 shows a seventh exemplary embodiment of a motor vehicle built-in unit according to the invention, which unit, like the sixth exemplary embodiment, permits mechanical adaptation to various types of plug-type connector of a motor vehicle, but does not have an adapter control unit. This exemplary embodiment is advantageous if, for example, just the basic functions of the motor vehicle built-in unit are to be used but the built-in unit is to be adapted to different types of plug-type connector. The seventh exemplary embodiment supplies such a motor vehicle built-in unit which can be implemented at low cost and can easily be converted to different types of plug-type connector.

The present invention, as illustrated in FIGS. 1–7, thus provides for a motor vehicle built-in unit which can easily be adapted, mechanically and/or electronically, to different motor vehicle manufacturers or different types of motor vehicles by virtue of a modular design concept.

The non-modular prior art concept is illustrated in FIG. 8. There, the control unit 3 and the connection 4 to the motor vehicle and the auxiliary devices are combined in the unitary system which is housed in the housing of the unit 1.

We claim:

1. A motor vehicle built-in unit for a mobile phone, comprising:
   a central control unit to be connected to a mobile phone, the mobile phone having a mobile phone-specific communications protocol;
   an interface connected between and adapted to exchange signals between said central control unit and a motor vehicle, the motor vehicle having a motor vehicle-specific communications protocol differing from the mobile phone-specific communications protocol;
   a motor vehicle-specific adapter control unit adapting functions of said central control unit to the respective type of motor vehicle; and
   a device in said central control unit converting signals between the motor vehicle-specific communications protocol and the mobile phone-specific communications protocol.

2. The motor vehicle built-in unit according to claim 1, wherein said adapter control unit includes a device for converting respective signal levels present at said interface.

3. The motor vehicle built-in unit according to claim 1, wherein said adapter control unit enables a connection of the mobile phone to one of a radio of the motor vehicle, a lighting circuit of the motor vehicle, and a databus of the motor vehicle.

4. The motor vehicle built-in unit according to claim 1, which comprises a housing commonly housing said adapter control unit, said central control unit, and said interface.

5. The motor vehicle built-in unit according to claim 1, which further comprises a separate housing enclosing said adapter control unit, a standardized plug-type connector for connecting said adapter control unit to said central control unit, and a motor vehicle-specific plug-type connector for connecting said adapter control unit to the motor vehicle.

6. The motor vehicle built-in unit according to claim 1, which further comprises a standardized plug-type connector for connecting said central control unit to the motor vehicle.

7. The motor vehicle built-in unit according to claim 6, which further comprises a standardized plug-type connector for connecting said adapter control unit to the motor vehicle.

8. The motor vehicle built-in unit according to claim 1, which comprises a motor vehicle-specific plug-type connector for connecting the built-in unit to the motor vehicle.

9. The motor vehicle built-in unit according to claim 8, which further comprises a housing enclosing said central control unit and said a motor vehicle-specific adapter control unit, and wherein said motor vehicle-specific plug-type connector is connected to said adapter control unit via a cable connection guided through said housing.

10. The motor vehicle built-in unit according to claim 1, which comprises a standardized plug-type device and a motor vehicle-specific plug-type device for connecting the built-in unit to the motor vehicle.

11. The device according to claim 10, wherein said central control unit is connectable to the motor vehicle by means of said standardized plug-type connector and said adapter control unit is connectable to the motor vehicle by means of said motor vehicle-specific plug-type connector.

12. The motor vehicle built-in unit according to claim 1, wherein said interface is adapted to connect one of said central control unit and said adapter control unit to the motor vehicle selectively via a standardized plug-type connector or a motor vehicle-specific plug-type connector.

13. The motor vehicle built-in unit according to claim 12, wherein said motor vehicle-specific plug-type connector is connected to said adapter control unit via a cable connection.

14. The motor vehicle built-in unit according to claim 12, which further comprises a housing enclosing said central control unit and said a motor vehicle-specific adapter control unit, and wherein the cable connection is guided through said housing.

15. The motor vehicle built-in unit according to claim 14, wherein said housing is formed with a housing cutout for said standardized plug-type connector, and the cable connection is guided through said housing cutout of said standardized plug-type connector.

16. A motor vehicle built-in unit for a mobile phone, comprising:

a central control unit to be connected to a mobile phone, the mobile phone having a mobile phone-specific communications protocol;

an interface connected between and adapted to exchange signals between said central control unit and a motor vehicle, the motor vehicle having a motor vehicle-specific communications protocol differing from the mobile phone-specific communications protocol;

a motor vehicle-specific adapter control unit adapting functions of said interface to the respective type of motor vehicle; and a device in said interface converting signals between the motor vehicle-specific communications protocol and the mobile phone-specific communications protocol.

17. A motor vehicle built-in unit for a mobile phone, comprising:

an interface connecting to a component of a motor vehicle, the component exchanging motor vehicle signals with said interface;

a central control unit connected to said interface and a mobile phone, the mobile phone exchanging mobile phone signals with said central control unit, the mobile phone signals differing from the motor vehicle signals; and a motor vehicle-specific adapter in said control unit translating between the mobile phone signals and the motor vehicle signals.

18. The motor vehicle built-in unit according to claim 17, wherein said component is a lighting circuit.

19. The motor vehicle built-in unit according to claim 17, wherein said component is a radio.

20. The motor vehicle built-in unit according to claim 17, wherein said component is a databus of the motor vehicle.

* * * * *